US011138066B1

(12) United States Patent
Gorobets et al.

(10) Patent No.: US 11,138,066 B1
(45) Date of Patent: Oct. 5, 2021

(54) PARITY SWAPPING TO DRAM

(71) Applicant: Western Digital Technologies, Inc., San Jose, CA (US)

(72) Inventors: Sergey Anatolievich Gorobets, Edinburgh (GB); Daniel L. Helmick, Broomfield, CO (US); Liam Parker, Edinburgh (GB); Alan D. Bennett, Edinburgh (GB); Peter Grayson, Grand Rapids, MI (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/884,577

(22) Filed: May 27, 2020

(51) Int. Cl.
*G06F 11/00* (2006.01)
*G06F 11/10* (2006.01)
*G06F 3/06* (2006.01)

(52) U.S. Cl.
CPC .......... *G06F 11/1004* (2013.01); *G06F 3/065* (2013.01); *G06F 3/068* (2013.01); *G06F 3/0619* (2013.01)

(58) Field of Classification Search
None
See application file for complete search history.

(56) References Cited

U.S. PATENT DOCUMENTS

2005/0005044 A1*  1/2005  Liu .................... G06F 3/0611 710/74
2014/0129874 A1    5/2014  Zaltsman et al.
2016/0266965 A1*  9/2016  B .......................... G06F 11/108
2017/0091022 A1    3/2017  Khan et al.
2019/0114225 A1*  4/2019  Gopalakrishnan .......................... G06F 11/1044
2019/0266046 A1*  8/2019  Bahirat ................ G06F 11/10
2020/0218605 A1*  7/2020  Subramanian ...... G06F 11/1068

OTHER PUBLICATIONS

A. A. McEwan and M. Z. Komsul, "A Real-Time Dependable Flash Storage System," in IEEE Access, vol. 7, pp. 142974-142990, 2019, doi: 10.1109/ACCESS.2019.2944764. (Year: 2019).*
International Search Report and the Written Opinion for International Application No. PCT/US2020/066108 dated Apr. 18, 2021, 8 pages.

* cited by examiner

*Primary Examiner* — Daniel F. McMahon
(74) *Attorney, Agent, or Firm* — Patterson & Sheridan LLP; Steven H. Versteeg

(57) ABSTRACT

The A storage device comprises a controller comprising first random access memory (RAM1), second random access memory (RAM2), and a storage unit divided into a plurality of streams. A first command to write data to a first stream is received, first XOR data is generated in the RAM1, and the data of the first command is written to the first stream. When a second command to write data to a second stream is received, the generated first XOR data is copied from the RAM1 to the RAM2, and second XOR data for the second stream is copied from the RAM2 to the RAM1. The second XOR data is updated with the second command, and the data of the second command is written to the second stream. The updated second XOR data is copied from the RAM1 to the RAM2.

20 Claims, 11 Drawing Sheets

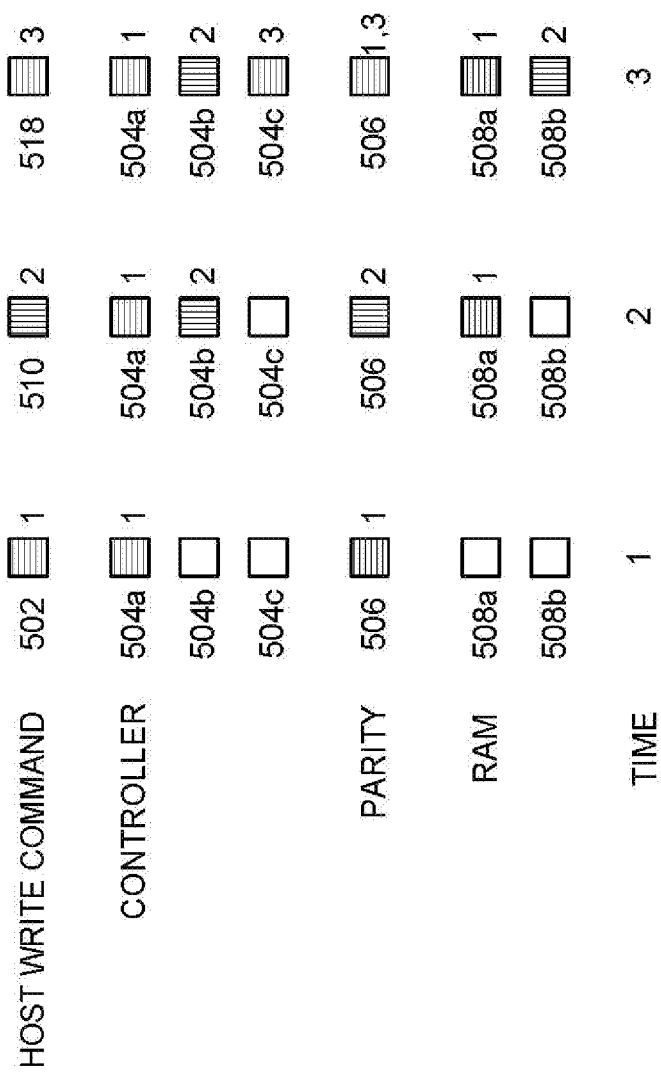

PARITY SWAPPING TO DRAM

BACKGROUND OF THE DISCLOSURE

Field of the Disclosure

Embodiments of the present disclosure generally relate to storage devices, such as sold state drives (SSDs).

Description of the Related Art

Storage devices, such as SSDs, may be used in computers in applications where relatively low latency and high capacity storage are desired. For example, SSDs may exhibit lower latency, particularly for random reads and writes, than hard disk drives (HDDs). Typically, a controller of the SSD receives a command to read or write data from a host device to a memory device. The data is read and written to one or more erase blocks in the memory device. Each of the erase blocks is associated with a logical block address so that the SSD and/or the host device know the location of where the data is stored. One or more erase blocks may be grouped together by their respective logical block addresses to form a plurality of streams.

Typically, one die in each stream is dedicated to storing parity data, such as XOR data, for the stream. As a command is received by the storage device to write data to a particular stream, the data associated with the command is written to the memory device, and parity data is simultaneously generated for the data in order to protect the data. The parity data is then stored in random access memory (RAM), such as SRAM or DRAM, within the storage device. However, the storage device generally comprises a very limited amount of RAM, as RAM is expensive. Since parity data is generated for each write command received, the parity data takes up a lot of the valuable RAM space, which may reduce the amount of RAM space available for other data, or may require a greater amount of RAM to be included in the storage device. Thus, the overall cost of the storage device may be increased, or the capabilities of the storage device may be limited.

Therefore, what is needed is a new method of efficiently operating a storage device.

SUMMARY OF THE DISCLOSURE

The present disclosure generally relates to methods of operating storage devices. The storage device comprises a controller comprising first random access memory (RAM1), second random access memory (RAM2), and a storage unit divided into a plurality of streams. A first command to write data to a first stream is received, first XOR data is generated in the RAM1, and the data of the first command is written to the first stream. When a second command to write data to a second stream is received, the generated first XOR data is copied from the RAM1 to the RAM2, and second XOR data for the second stream is copied from the RAM2 to the RAM1. The second XOR data is updated with the second command, and the data of the second command is written to the second stream. The updated second XOR data is copied from the RAM1 to the RAM2.

In one embodiment, a storage device comprises a non-volatile storage unit. The capacity of the non-volatile storage unit is divided into a plurality of streams. The non-volatile storage unit comprises a plurality of dies, each of the plurality of dies comprising a plurality of erase blocks. The storage device further comprises a first volatile memory unit, a controller coupled to the non-volatile storage unit and the first volatile memory unit, and a controller comprising a second volatile memory unit. The controller is configured to receive commands to write data to one or more streams, generate first parity data for a first stream in the second volatile memory unit, and copy the first parity data for the first stream from the second volatile memory unit to the first volatile memory unit. The controller is also configured to copy second parity data for a second stream from the first volatile memory unit to the second volatile memory unit, update the second parity data for the second stream in the second volatile memory unit, and update the first parity data for the first stream in the second volatile memory unit.

In another embodiment, a storage device comprises a non-volatile storage unit. The capacity of the non-volatile storage unit is divided into a plurality of streams. The non-volatile storage unit comprises a plurality of dies, each of the plurality of dies comprising a plurality of erase blocks. The storage device further comprises a first volatile memory unit, a controller coupled to the non-volatile storage unit and the first volatile memory unit, and a controller comprising a second volatile memory unit. The controller is configured to receive a first command to write data to a first stream in the non-volatile storage unit, generate first parity data for the data associated with first command and write the data associated with the first command to the first stream simultaneously, wherein the first parity data is stored in the second volatile memory unit. The controller is also configured to receive a second command to write data to a second stream in the non-volatile storage unit, copy second parity data associated with the second stream from the first volatile memory unit to the second volatile memory unit, and update the second parity data with the data associated with second command and write the data associated with the second command to the second stream simultaneously.

In another embodiment, a storage device comprises a non-volatile storage unit. The capacity of the non-volatile storage unit is divided into a plurality of streams. The non-volatile storage unit comprises a plurality of dies, each of the plurality of dies comprising a plurality of erase blocks. The storage device further comprises a DRAM unit, a controlled coupled to the non-volatile storage unit and the DRAM unit, and a controlled comprising a SRAM unit. The controller is configured to receive a first command to write data to a first stream in the non-volatile storage unit, update first parity data with the data associated with first command in a first location of the SRAM unit, and simultaneously, write the data associated with the first command to the first stream. The controller is also configured to receive a second command to write data to a second stream in the non-volatile storage unit, copy the updated first parity data from the SRAM unit to the DRAM unit, and simultaneously, copy second parity data associated with the second stream from the DRAM unit to a second location in the SRAM unit. The controller is also configured to update the second parity data with the data associated with second command and write the data associated with the second command to the second stream simultaneously. The controller is also configured to receive a third command to write data to a third stream in the non-volatile storage unit, erase the updated first parity data from the first location in the SRAM unit, and generate third parity data in the first location of the SRAM unit, and simultaneously, write the data associated with the third command to the first stream.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 5A-5B illustrate schematic diagrams of updating data in flight over time in the storage device, according to various embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to methods of operating storage devices. The storage device comprises a controller comprising first random access memory (RAM1), second random access memory (RAM2), and a storage unit divided into a plurality of streams. A first command to write data to a first stream is received, first XOR data is generated in the RAM1, and the data of the first command is written to the first stream. When a second command to write data to a second stream is received, the generated first XOR data is copied from the RAM1 to the RAM2, and second XOR data for the second stream is copied from the RAM2 to the RAM1. The second XOR data is updated with the second command, and the data of the second command is written to the second stream. The updated second XOR data is copied from the RAM1 to the RAM2.

Figure 1:
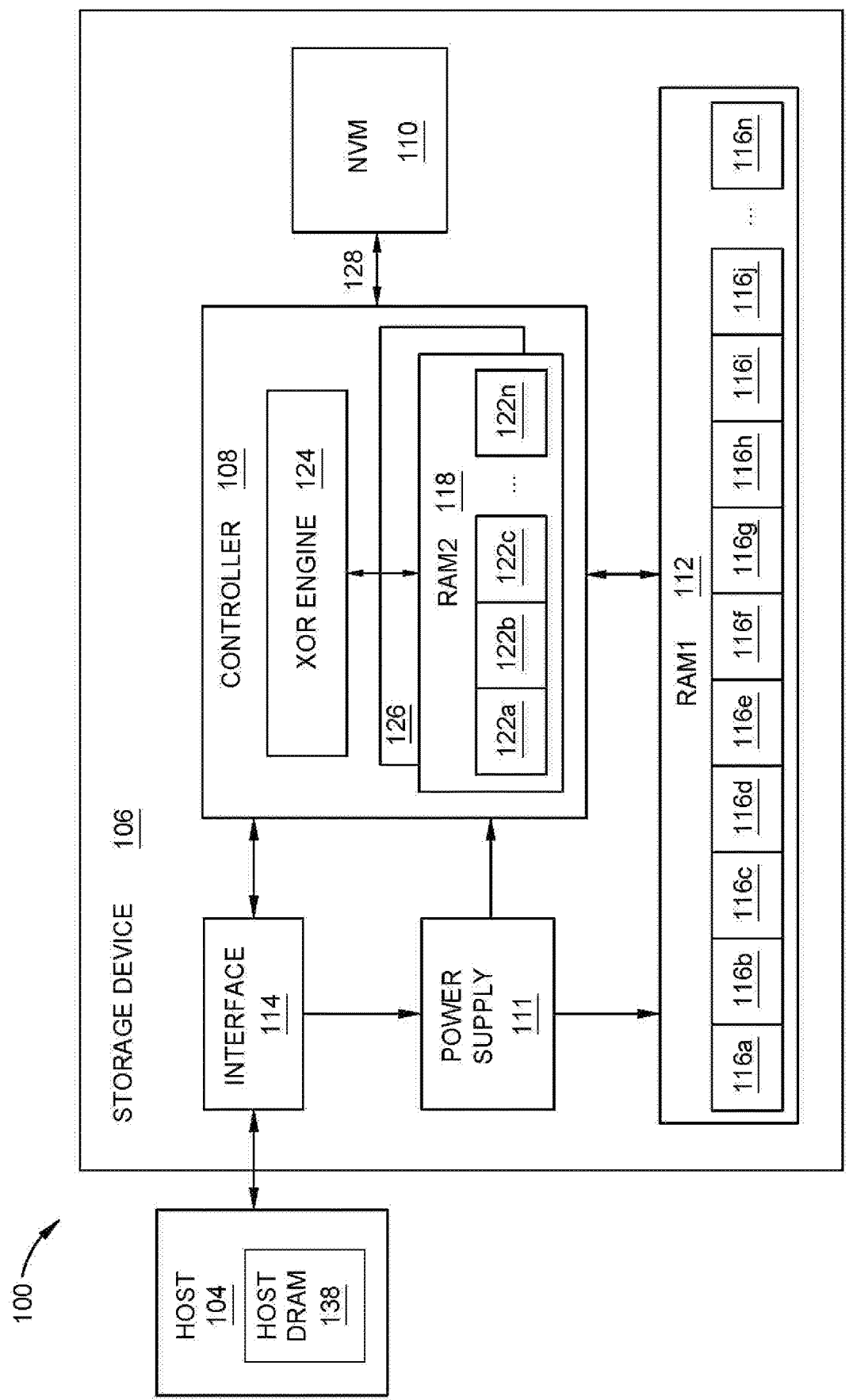
FIG. 1 is a schematic block diagram illustrating a storage system, according to one embodiment.

FIG. 1 is a schematic block diagram illustrating a storage system 100 in which storage device 106 may function as a storage device for a host device 104, in accordance with one or more techniques of this disclosure. For instance, the host device 104 may utilize a storage unit 110, such as non-volatile memory (NVM), included in storage device 106 to store and retrieve data. The storage unit 110 may be any type of non-volatile memory, such as MRAM, NAND, NOR, or HDD, for example. In the following descriptions, the storage unit 110 is referenced as a non-volatile memory (NVM) 110 for simplification and exemplary purposes. The host device 104 comprises a host DRAM 138. In some examples, the storage system 100 may include a plurality of storage devices, such as the storage device 106, which may operate as a storage array. For instance, the storage system 100 may include a plurality of storages devices 106 configured as a redundant array of inexpensive/independent disks (RAID) that collectively function as a mass storage device for the host device 104.

The storage system 100 includes a host device 104 which may store and/or retrieve data to and/or from one or more storage devices, such as the storage device 106. As illustrated in FIG. 1, the host device 104 may communicate with the storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, and the like.

The storage device 106 includes a controller 108, NVM 110, a power supply 111, a first random access memory (RAM) or volatile memory 112, such as a dynamic random-access memory (DRAM), and an interface 114. The controller 108 may comprise a parity engine or a XOR engine 124 and a second RAM or volatile memory 118, such as a static random-access memory (SRAM). In the following descriptions, a first RAM or volatile memory 112 is referenced to as DRAM and a second RAM or volatile memory 118 is referenced as SRAM for simplification and exemplary purposes. In some examples, the storage device 106 may include additional components not shown in FIG. 1 for sake of clarity. For example, the storage device 106 may include a printed circuit board (PCB) to which components of the storage device 106 are mechanically attached and which includes electrically conductive traces that electrically interconnect components of the storage device 106, or the like. In some examples, the physical dimensions and connector configurations of the storage device 106 may conform to one or more standard form factors. Some example standard form factors include, but are not limited to, 2.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the storage device 106 may be directly coupled (e.g., directly soldered) to a motherboard of the host device 104.

The interface 114 of the storage device 106 may include one or both of a data bus for exchanging data with the host device 104 and a control bus for exchanging commands with the host device 104. The interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, PCIe, non-volatile memory express (NVMe), OpenCAPI, GenZ, Cache Coherent Interface Accelerator (CCIX), Compute Express Link (CXL), Open Channel SSD (OCSSD), or the like. The electrical connection of the interface 114 (e.g., the data bus, the control bus, or both) is electrically connected to the controller 108, providing electrical connection between the host device 104 and the controller 108, allowing data to be exchanged between the host device 104 and the controller 108. In some examples, the electrical connection of the interface 114 may also permit the storage device 106 to receive power from the host device 104. For example, as illustrated in FIG. 1, the power supply 111 may receive power from the host device 104 via the interface 114.

The storage device 106 includes NVM 110, which may include a plurality of memory devices. NVM 110 may be configured to store and/or retrieve data. For instance, a memory device of NVM 110 may receive data and a message from the controller 108 that instructs the memory device to store the data. Similarly, the memory device of NVM 110 may receive a message from the controller 108 that instructs the memory device to retrieve data. In some examples, each of the memory devices may be referred to as a die. In some examples, a single physical chip may include a plurality of dies (i.e., a plurality of memory devices). In some examples, each of the memory devices may be configured to store relatively large amounts of data (e.g., 128 MB, 256 MB, 412 MB, 1 GB, 2 GB, 3 GB, 8 GB, 16 GB, 22 GB, 54 GB, 128 GB, 256 GB, 412 GB, 1 TB, etc.).

In some examples, each memory device of NVM 110 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, hard disk drives (HDD), and any other type of non-volatile memory devices.

The NVM 110 may comprise a plurality of flash memory devices. Flash memory devices may include NAND or NOR based flash memory devices, and may store data based on a charge contained in a floating gate of a transistor for each flash memory cell. In NAND flash memory devices, the flash memory device may be divided into a plurality of blocks which may divided into a plurality of pages. Each block of the plurality of blocks within a particular memory device may include a plurality of NAND cells. Rows of NAND cells may be electrically connected using a wordline to define a page of a plurality of pages. Respective cells in each of the plurality of pages may be electrically connected to respective bit lines. Furthermore, NAND flash memory devices may be 2D or 3D devices, and may be single level cell (SLC), multi-level cell (MLC), triple level cell (TLC), quad level cell (QLC), or other higher iterations of level cell. The controller 108 may write data to and read data from NAND flash memory devices at the page level and erase data from NAND flash memory devices at the block level.

A portion of the NVM 110 may be formatted into logical blocks such that a capacity of the NVM 110 is divided into a plurality of streams. Each of the streams comprise a plurality of physical or erase blocks of the NVM 110, and each of the erase blocks are associated a plurality of logical blocks. Each of the logical blocks is associated with a unique LBA or sector. Each of the streams may have a size aligned to the capacity of one or more erase blocks of the NVM 110. When the controller 108 receives a command, such as from a host device 104, the controller 108 can read data from and write data to the plurality of logical blocks associated with the plurality of erase blocks of the NVM 110.

The storage device 106 includes a power supply 111, which may provide power to one or more components of the storage device 106. When operating in a standard mode, the power supply 111 may provide power to the one or more components using power provided by an external device, such as the host device 104. For instance, the power supply 111 may provide power to the one or more components using power received from the host device 104 via the interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The storage device 106 also includes volatile memory, which may be used by controller 108 to store information. Volatile memory may be comprised of one or more volatile memory devices. In some examples, the controller 108 may use volatile memory as a cache. For instance, the controller 108 may store cached information in volatile memory until cached information is written to the NVM 110. Examples of volatile memory 112 include, but are not limited to, RAM, DRAM 112, SRAM 118, and synchronous dynamic RAM (SDRAM (e.g., DDR1, DDR2, DDR3, DDR3L, LPDDR3, DDR4, LPDDR4, DDR5, LPDDR5, and the like)). As illustrated in FIG. 1, volatile memory may consume power received from the power supply 111.

The various types of volatile memories may be used with different access properties. For example, DRAM 112 may be arranged for longer burst accesses to allow for improved bandwidth (BW) of the same access bus. Alternatively, DRAM 112 may be used with smaller accesses such that random small accesses may have better latency. The controller 108 comprises additional optional SRAM and/or embedded MRAM 126. Embedded MRAM 126 is another alternative memory that may be used in another embodiment. Similarly, the access to the MRAM 126 can be optimized for different design purposes, but the quantity of embedded MRAM 126 in the SSD controller 108 may be cost sensitive. Therefore, the choice of how much data and which data goes into the premium non-volatile memory and premium volatile memory will subject to system tradeoffs.

The storage device 106 includes a controller 108, which may manage one or more operations of the storage device 106. For instance, the controller 108 may manage the reading of data from and/or the writing of data to the NVM 110 via a toggle mode (TM) bus 128. The controller 108 may comprise of an XOR engine 124. The data may be stored in either DRAM 112, SRAM 118, or both DRAM 112 and SRAM 118. In some embodiments, when the storage device 106 receives a write command from the host device 104, the controller 108 may initiate a data storage command to store data to the NVM 110 and monitor the progress of the data storage command. The controller 108 may determine at least one operational characteristic of the storage system 100 and store the at least one operational characteristic to the NVM 110.

The controller 108 may include a XOR engine 124 with logic and/or features to generate XOR parity information. The XOR engine 124 is a type of parity engine and is called out as a XOR engine for exemplary purposes. However, the XOR engine 124 may include other embodiments that a parity engine comprises. Exclusive OR (XOR) parity information may be used to improve reliability of storage device 106, such as enabling data recovery of failed writes or failed reads of data to and from NVM or enabling data recovery in case of power loss. The reliability may be provided by using XOR parity information generated or computed based on data stored to storage device 106. Data may pass through the XOR engine 124 to be written to the NVM 110. The XOR engine 124 may generate a parity stream to be written to the SRAM 118. The SRAM 118 and the DRAM 112 may each contain a plurality of regions which data may be written to. Data may be transferred from an SRAM region 122a-122n in the SRAM 118 to a DRAM region 116a-116n in the DRAM 112, and vice-versa.

The SRAM and DRAM devices 118, 112 each individually comprises one or more dies. Each of the one or more dies comprises one or more ranks which is comprised of one or more banks. The banks are composed of rows and pages. The SRAM 118 in the controller 108 may be logically or physical separated into different SRAM areas or regions 122a-122n for use by the controller 108. Similarly, the DRAM 112 may be logically or physical separated into different DRAM areas or regions 116a-116n for use by the controller 108. The MRAM inside of the controller 108 may be logically or physical separated into different MRAM areas or regions (not shown). External attachments of MRAM often have a vendor specific structure and access not covered here.

Figure 2:
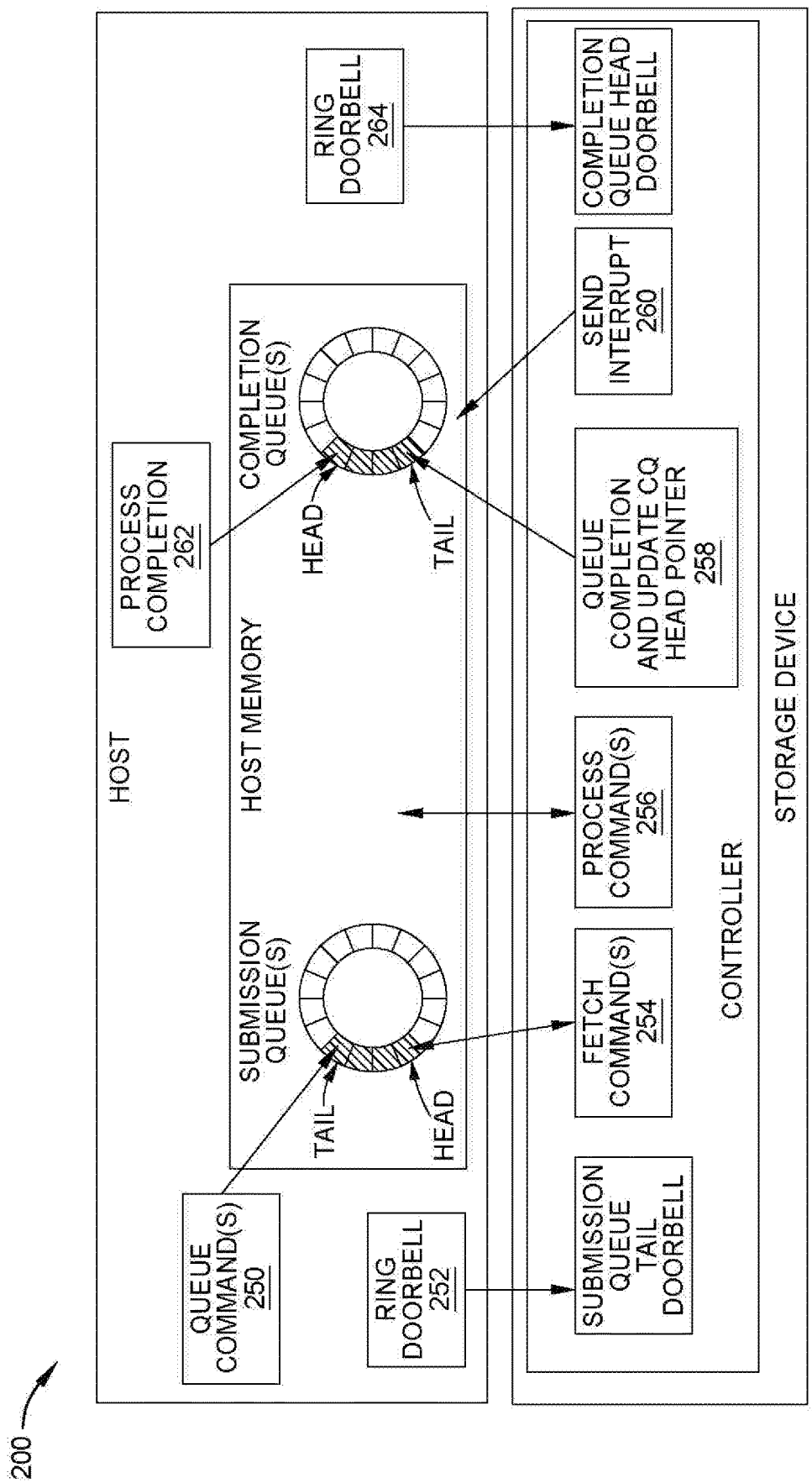
FIG. 2 is a block diagram illustrating a method of operating a storage device to execute a read or write command, according to one embodiment.

FIG. 2 is a block diagram illustrating a method 200 of operating a storage device to execute a read or write command, according to one embodiment. Method 200 may be used with the storage system 100 having a host device 104 and a storage device 106 comprising a controller 108. Method 200 may be used with the device a host device and a storage device comprising a command processor.

Method 200 begins at operation 250, where the host device writes a command into a submission queue as an entry. The host device may write one or more commands into the submission queue at operation 250. The commands may be read commands or write commands. The host device may comprise one or more submission queues. The host device may write one or more commands to the submission queue in any order (i.e., a submission order), regardless of the sequential write order of the one or more commands (i.e., a sequential processing order).

In operation 252, the host device writes one or more updated submission queue tail pointers and rings a doorbell or sends an interrupt signal to notify or signal the storage device of the new command that is ready to be executed. The host may write an updated submission queue tail pointer and send a doorbell or interrupt signal for each of the submission queues if there are more than one submission queues. In operation 254, in response to receiving the doorbell or interrupt signal, a controller of the storage device fetches the command from the one or more submission queue, and the controller receives or DMA reads the command.

In operation 256, the controller processes the command and writes or transfers data associated with the command to the host device memory. The controller may process more than one command at a time. The controller may process one or more commands in the submission order or in the sequential order. Processing a write command may comprise identifying a stream to write the data associated with the command to and writing the data to one or more logical block addresses (LBA) of the stream.

In operation 258, once the command has been fully processed, the controller writes a completion entry corresponding to the executed command to a completion queue of the host device and moves or updates the CQ head pointer to point to the newly written completion entry.

In operation 260, the controller generates and sends an interrupt signal or doorbell to the host device. The interrupt signal indicates that the command has been executed and data associated with the command is available in the memory device. The interrupt signal further notifies the host device that the completion queue is ready to be read or processed.

In operation 262, the host device processes the completion entry. In operation 264, the host device writes an updated CQ head pointer to the storage device and rings the doorbell or sends an interrupt signal to the storage device to release the completion entry.

Figure 3:
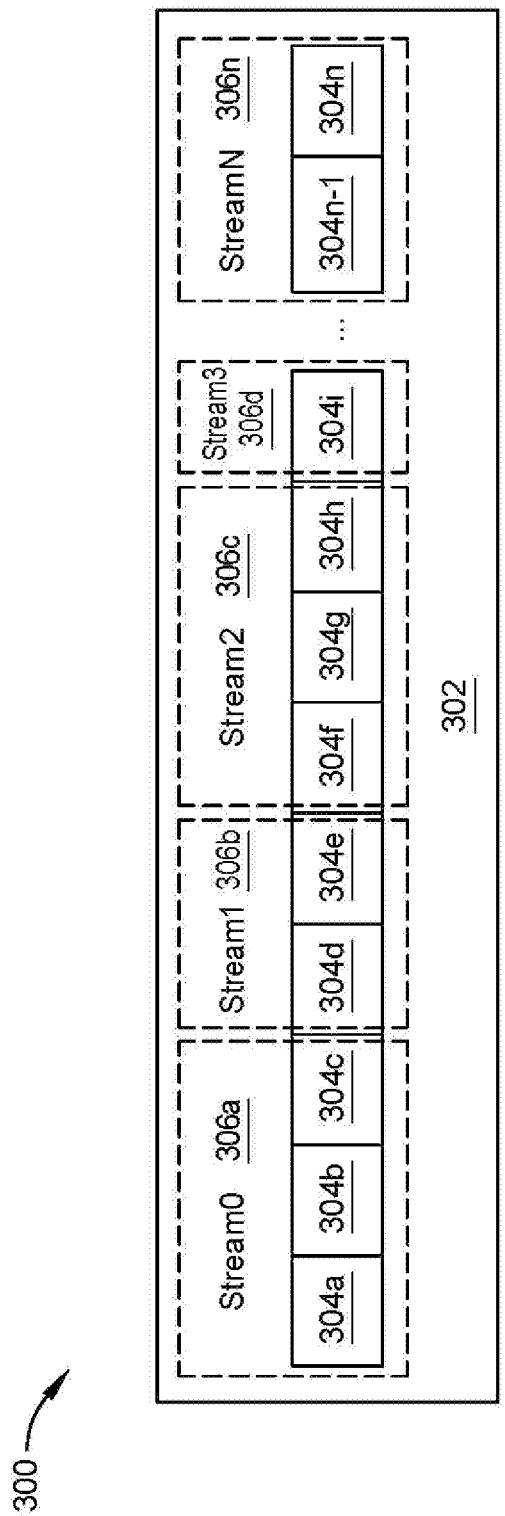
FIG. 3 illustrates of a non-volatile storage unit comprising a plurality of dies, according to one embodiment.

FIG. 3 illustrates of a storage device 300 including a non-volatile storage unit 302 comprising a plurality of dies 304a-304n, according to one embodiment. In the following descriptions, the non-volatile storage unit 302 is referred to as a NVM for simplification and exemplary purposes. The NVM 302 may be the NVM 110 of FIG. 1.

In one embodiment, the NVM 302 is a NAND device. The NAND device comprises one or more dies. Each of the one or more dies comprises one or more planes. Each of the one or more planes comprises one or more erase blocks. Each of the one or more erase blocks comprises one or more wordlines (e.g., 256 wordlines). Each of the one or more wordlines may be addressed in one or more pages. For example, an MLC NAND die may use upper page and lower page to reach the two bits in each cell of the full wordline (e.g., 16 kB per page). Furthermore, each page can be accessed at a granularity equal to or smaller than the full page. A controller can frequently access NAND in user data granularity LBA sizes of 512 bytes. Thus, as referred to in the below description, NAND locations are equal to a granularity of 512 bytes. As such, an LBA size of 512 bytes and a page size of 16 KiB for two pages of an MLC NAND results in 32 LBAs per wordline. However, the NAND location size is not intended to be limiting, and is merely used as an example.

In some embodiments, a NAND location may be equal to a wordline. In such an embodiment, the controller may optionally aggregate several write commands in another memory location such as DRAM or SRAM prior to programming a full wordline composed of multiple write commands. Write commands that are longer than a wordline will be able to program and fill a complete wordline with some of the data, and the excess data beyond a wordline will be used to fill the next wordline. For the purposes of this description, the write data sizes are equal to a NAND location of 512 bytes; however, this is not intended to be limiting.

The capacity of the NVM 302 is divided into a plurality of streams 306a-306n (collectively referred to as streams 306), and each of the streams 306 comprises a plurality of dies 304. The NVM 302 of the storage device can be formatted into logical blocks such that the capacity is divided into a plurality of streams 306. Each of the plurality of streams 306 may have a state that is open and active, open and closed, empty, full, or offline. An empty stream switches to an open and active stream once a write is scheduled to the stream or if the stream open command is issued by the host. The controller can move a stream between stream open and stream closed states, which are both active states. If a stream is active, the stream comprises open blocks that may be written to, and the host may be provided a description of recommended time in the active state.

The active streams may be either open or closed. An open stream is an empty or partially full stream that is ready to be written to and has resources currently allocated. A closed stream is an empty or partially full stream that is not currently receiving writes from the host in an ongoing basis. The movement of a stream from an open state to a closed state allows the controller to reallocate resources to other tasks. These tasks may include, but are not limited to, other streams that are open, other conventional non-stream regions, or other controller needs.

The term "written to" includes programming user data on 0 or more NAND locations in an erase block and/or partially filled NAND locations in an erase block when user data has not filled all of the available NAND locations. The term "written to" may further include moving a stream to full due to internal drive handling needs (open block data retention concerns because the bits in error accumulate more quickly on open erase blocks), the storage device closing or filling a stream due to resource constraints, like too many open streams to track or discovered defect state, among others, or a host device closing the stream for concerns such as there being no more data to send the drive, computer shutdown, error handling on the host, limited host resources for tracking, among others.

Each of the streams 306 comprise a plurality of physical or erase blocks (not shown) of a memory unit or NVM 302, and each of the erase blocks are associated a plurality of logical blocks (not shown). Each of the streams 306 may be a different size, and are not required to be aligned to the capacity of one or more erase blocks of a NVM or NAND device. A stream write size (SWS) is an optimal write size agreed on between the host, such as the host 104 of FIG. 1, and the storage device, such as the storage device 106 of FIG. 1. The SWS may be a factory setting of the storage device 300. Write sizes received in sizes less than the SWS may still be written to the relevant stream; however, the write performance may be limited.

When the controller receives a command, such as from a host device (not shown) or the submission queue of a host device, the command is received with a stream ID (e.g., stream0), which tells the controller which stream 306 of the plurality of streams 306 to write the data associated with the command to. The host device may select the stream ID for a command based on data the host device wants grouped together. Thus, the data stored within each stream 306 may be related or grouped together as determined by the host, such as the host 104 of FIG. 1.

Because the host is not restricted to any size granularity, the controller, such as the controller 108 of FIG. 1, in the SSD must be prepared to grow or shrink the capacity allocated to each stream. The controller will select a granularity of one or more EBs. The controller will add units of the granularity of one or more EBs to the stream as more physical capacity is required by the streams. If data is unmapped, deallocated, or trimmed, the controller may choose to erase EBs and return them to the free pool of available EBs for the addition to a stream needing capacity. Further, there may be occasions where stream data is overwritten. Thus, the controller may execute garbage collection within one stream or among several streams concurrently to compact the physical space and reclaim EBs when the free pool is low.

In FIG. 3, each die is composed of two planes (not shown), and each plane comprises a plurality of erase blocks (not shown). User data may be stored in any die 304a-304n-1 of the non-volatile storage unit 302. At least one die 304n may be dedicated to storing the data in flight, such as unwritten user data received from the host or XOR data or parity data associated with the user data. Unwritten user data may comprise small lengths or amount of data (e.g., less than the size of one or more wordlines) that are stored in a parking location or buffer, such as a region in the SRAM 118 (shown in FIGS. 4A-4F, for example), until the aggregated size of the data reaches a minimum size (e.g., the size of one or more wordlines), in which case the unwritten user data is written to the NVM 302. In one embodiment, data in flight may be stored in more than one die 304a-304n. Data in flight may be stored in any of the dies 304a-304n within the NVM 302, and is not limited to being stored in the last die 304n.

The XOR data or parity data, deemed as data in flight, is considered the parity buffer and may protect the loss of data due to data corruption, erroneous bit transfer, power loss, and other causes of data loss. The XOR data or parity data may be generated or updated in the SRAM, and temporarily stored in the SRAM and/or DRAM before being copied to the NVM 302, for example. Furthermore, in case of power failure, capacitors (not shown) located within the storage device, such as the storage device 106 of FIG. 1, may store an adequate amount of energy to program data from the DRAM, such as the DRAM 112 of FIG. 1, to the NVM 302 to help prevent data loss, for example.

FIGS. 4A-4F illustrate a schematic block diagram of generating and/or updating parity data or XOR data in either a second RAM or volatile memory, a first RAM or volatile memory, or both a first RAM or volatile memory and a second RAM or volatile memory, according to various embodiments. The system 100 of FIG. 1 will be used in accordance with FIGS. 4A-4F. In the following descriptions, a non-volatile storage unit 110 is referred to as a NVM, a first RAM or volatile memory 112 (i.e., a first RAM1) is referred to as DRAM, and a second RAM or volatile memory 118 (i.e., a second RAM2) is referred to as SRAM for simplification and exemplary purposes.

The phrase "XOR or parity data" is utilized throughout as an example of data in flight, and is not intended to be limiting, as other forms of data in flight may be relevant. In other words, the XOR or parity data discussed in the examples below is data in flight and may include unwritten host data. Unwritten user or host data may comprise small lengths or amount of data (e.g., less than the size of one or more wordlines) that are stored in a parking location or buffer until the aggregated size of the data reaches a minimum size (e.g., the size of one or more wordlines), in which case the unwritten user data is written to the NVM 110.

In FIGS. 4A-4F, parity data or XOR data is denoted by "Wxx" where "x" represents the write ID of an associated command. XOR data may be stored in either a SRAM region 122a-122n or a DRAM region 116a-116n or in both a SRAM region 122a-122n and a DRAM region 116a-116n. A SRAM region 122a-122n and a DRAM region 116a-116n may be any suitable size, such as 512 bytes. In the following descriptions, a non-volatile storage unit 110 may be referenced as a NVM for simplification.

The storage device 106 receives one or more commands from a host device 104, and the one or more commands pass through the controller 108 and an XOR engine 124 within the controller 108 before being written to the NVM 110. When the write data associated with the one or more commands pass through the XOR engine 124, the XOR engine 124 continuously generates or updates XOR data or parity data associated with the write data of each of the commands, and the write data associated with each of the commands is written to a stream in the NVM 110.

XOR data or parity data will generally be written sequentially to the SRAM 118 from the XOR engine 124. A SRAM region or a DRAM region may any suitable size, such as 512 bytes. The XOR engine 124 may write directly to the DRAM 112, but writes to the DRAM 112 are typically slower than writes to the SRAM 118, and writing directly to the DRAM 112 may cause a performance bottleneck, slowing down the overall write process. When a new command is received, the controller 108 or the XOR engine 124 may erase the data in a SRAM region 122a-122n that contains the oldest data. The parity data on the SRAM 118 may be copied or re-written to the DRAM 112. Data may be written to a DRAM region 116a-116n sequentially or randomly. In other words, if XOR or parity data associated with a first stream is stored in a first DRAM region 116a, new XOR or parity data for the first stream may either be re-written in the first DRAM region 116a, or the new XOR or parity data may be written to a new DRAM region, such as a fifth DRAM region 116e.

Figure 4A:
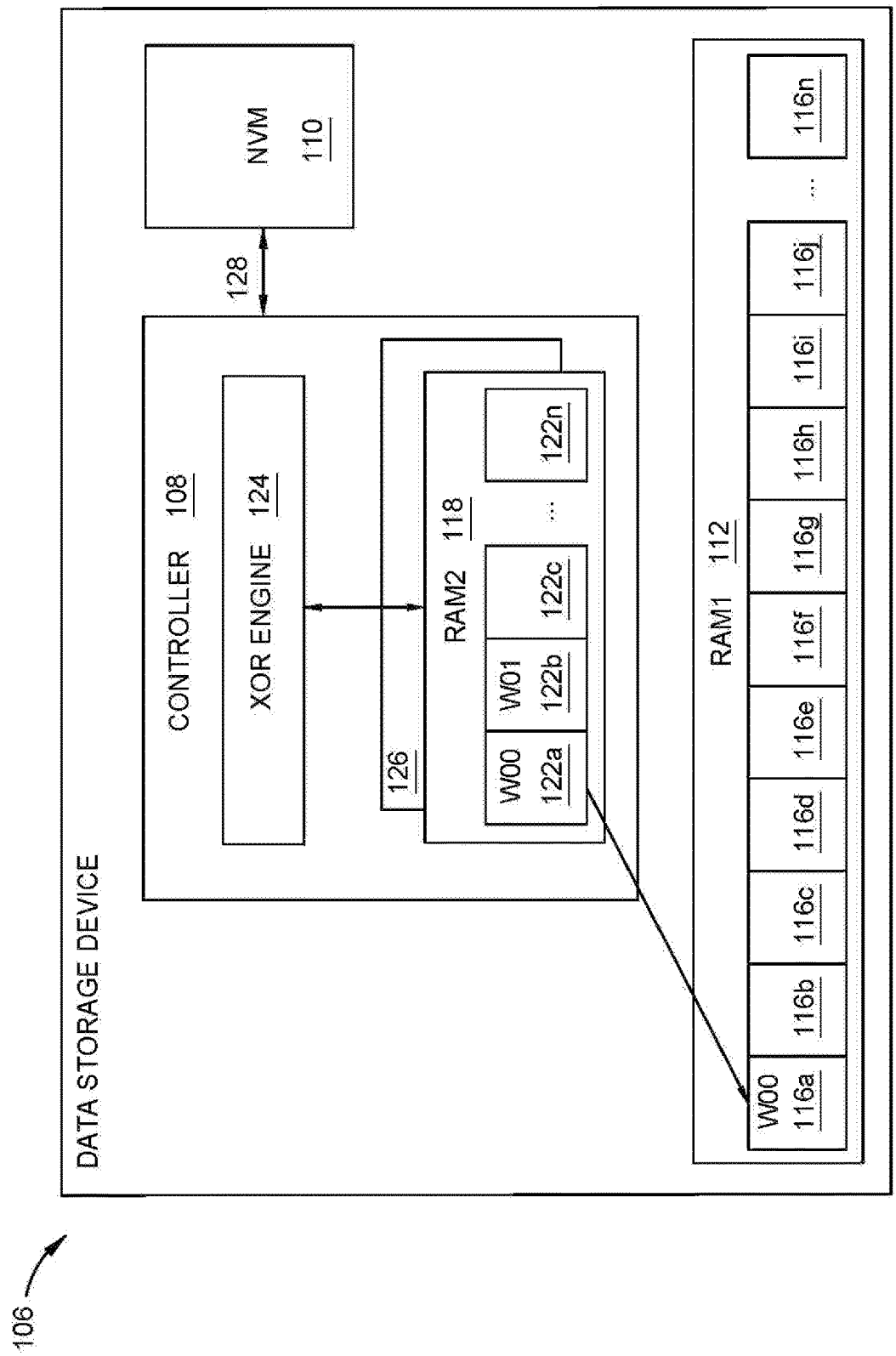
FIGS. 4A-4F illustrate a schematic block diagram of generating and/or updating parity data or XOR data in either SRAM, DRAM, or both SRAM and DRAM, according to various embodiments.

In FIG. 4A, first parity data W00 or XOR data associated with a first stream, such as the stream0 306a of FIG. 3, is written to a first SRAM region 122a when a first command is received to write data to the first stream. Simultaneously, the user data associated with the first command is written to the first stream. After the first parity data W00 is processed and stored in the first SRAM region 122a, the first parity data W00 is copied or re-written to the DRAM 112 in any available DRAM region, such as the first DRAM region 116a. As the first parity data W00 is being written to the first DRAM region 116a, second parity data W01 or XOR data associated with a second stream, such as the stream1 306b of FIG. 3, is generated in the second SRAM region 112b when a second command is received to write data to the second stream. Simultaneously, the user data associated with the second command is written to the second stream. Data may be copied or re-written to the DRAM 112 after the XOR or parity data has successfully been generated.

Figure 4B:
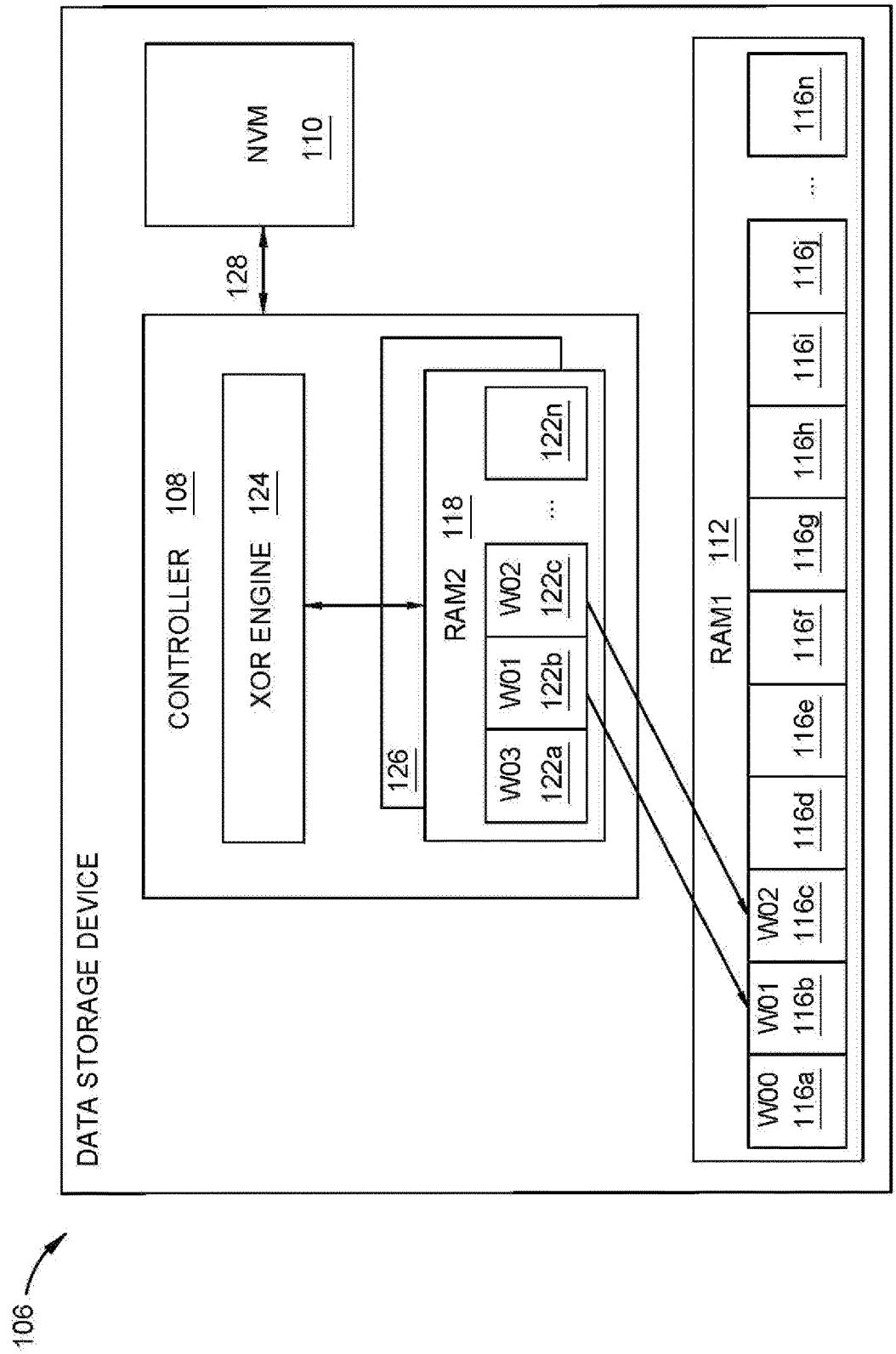

In FIG. 4B, second parity data W01 or XOR data associated with a second stream is stored in the second SRAM region 122b. The second parity data W01 or XOR data is then copied to an available DRAM region 116a-116n, such as the second DRAM region 116b. The third parity data W02 or XOR data associated with a third stream is generated in the third SRAM region 122c. After the second parity data W01 has been successfully written to the second DRAM region 116b, the third parity data W02 is copied to the third DRAM region 116c. The previous first XOR data W00 was stored in the first SRAM region 122a after being copied to the first DRAM region 116a, and has been erased by the controller 108 or the XOR engine 124 due to receiving a new write command. The location of the new parity or XOR data W03 associated a third command to write to a third stream is generated in the erased first SRAM region 122a.

Figure 4C:
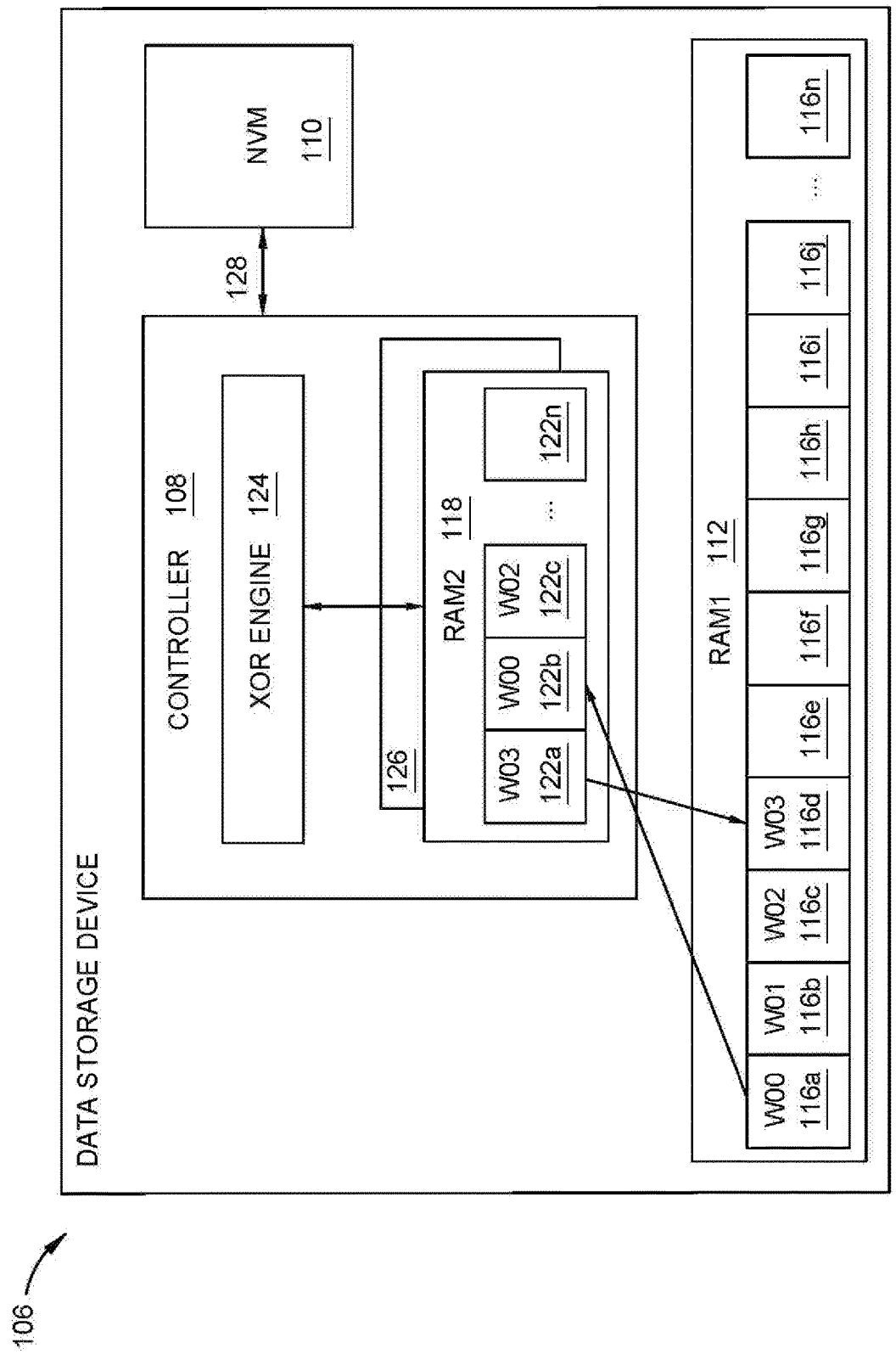

In FIG. 4C, the third parity data W03 in the first SRAM region 122a is re-written to the DRAM 112 in an available location, such as the fourth DRAM region 116d. If parity data for a stream exists in a DRAM region 116a-166n in the DRAM 112, and a command for the same stream is received, the existing parity data for the stream is transferred or copied to the SRAM 118. Thus, the existing parity data for the stream will be updated with the new parity data, rather than re-generating completely new parity data for the stream.

Figure 4D:
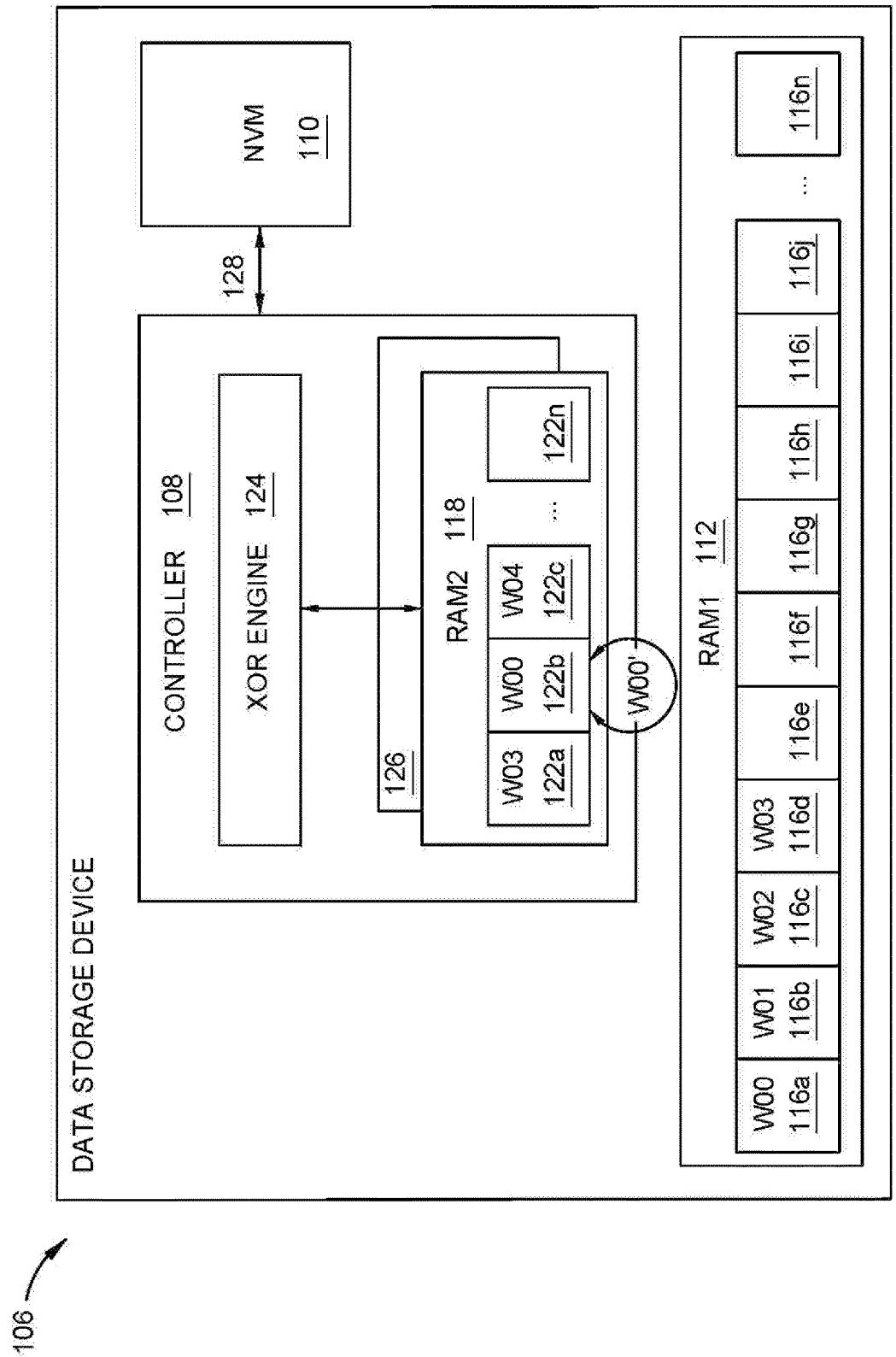

In FIG. 4C, a command to write data to the first stream is received, and the associated first parity data W00 in the first DRAM region 116a in the DRAM 112 is pulled from the DRAM 112 to the second SRAM region 122b in the SRAM 118 to be updated with the new command. In FIG. 4D, the first parity data W00 in the second SRAM region 122b is updated or re-written to the DRAM 112 as updated first parity data W00'. The updated first parity or XOR data W00' located in the second SRAM region 122b comprises parity or XOR data for the new write command corresponding to the first stream, along with the previous parity or XOR data already generated for the first stream.

Figure 4E:
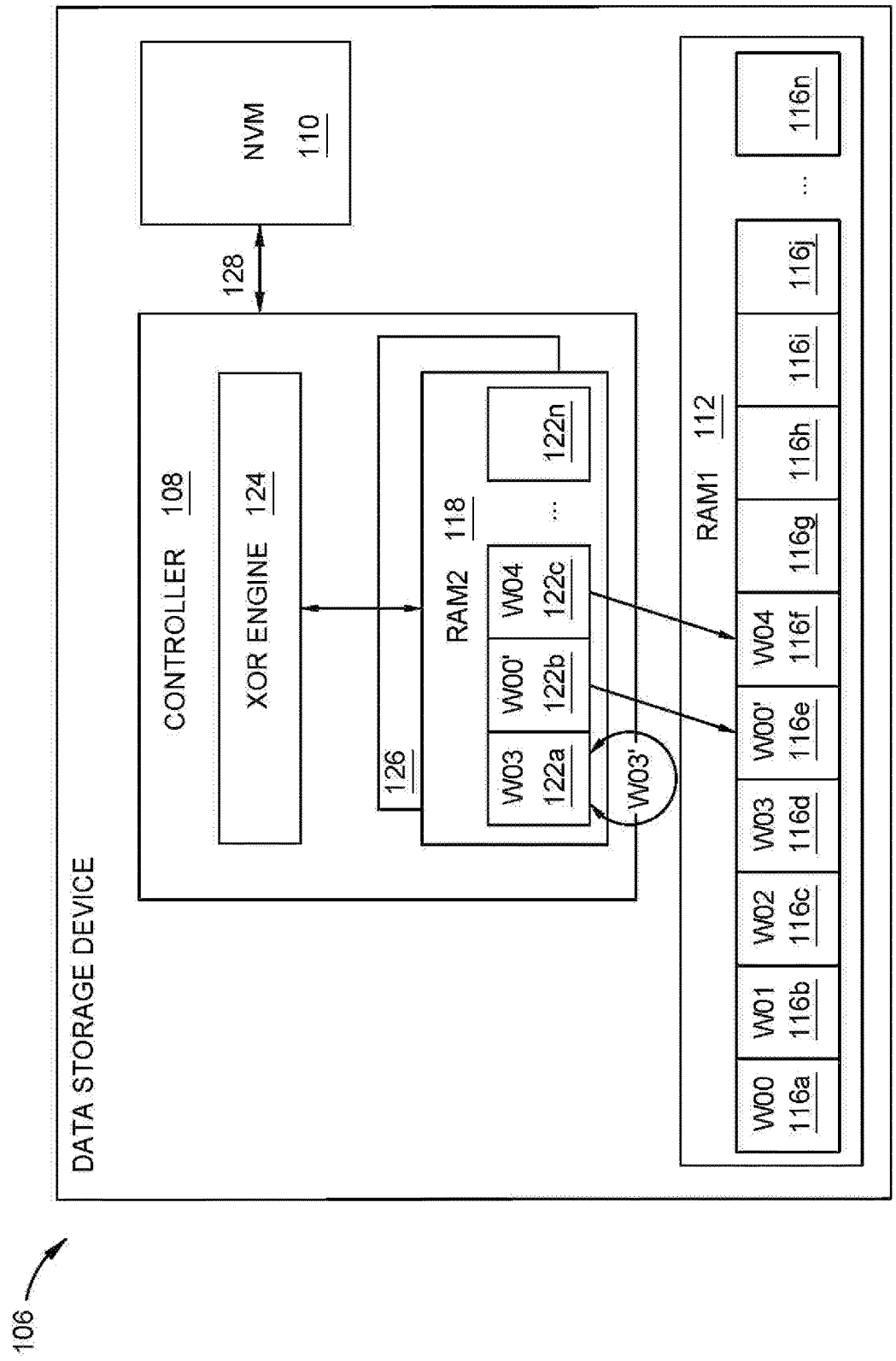

Parity data existing in the SRAM 118 may be updated if the data has not been erased. The new parity or XOR data for a stream may be updated in the SRAM region 122a-122n where the parity data for the stream is currently stored, without having to pull the parity data for the stream from the DRAM 112. In FIG. 4E, the updated first parity data W00' is written or copied to the DRAM 112 in an available DRAM region, such as the fifth DRAM region 116e. The updated first parity data W00' may be written to a new DRAM region, such as the fifth DRAM region 116e, as shown in FIG. 4E, or the updated first parity data W00' may be written or copied to a DRAM region currently storing outdated first parity data, such as the first DRAM region 116a storing the outdated first party data W00. Furthermore, fourth parity or XOR data W04 in the third SRAM region 122c associated with a fourth stream is written to a sixth SRAM region 116f. Since the third parity data W03 has not been erased from the first SRAM region 122a, the third parity data W03 is updated to W03' when a command is received to write data to the third stream.

Figure 4F:
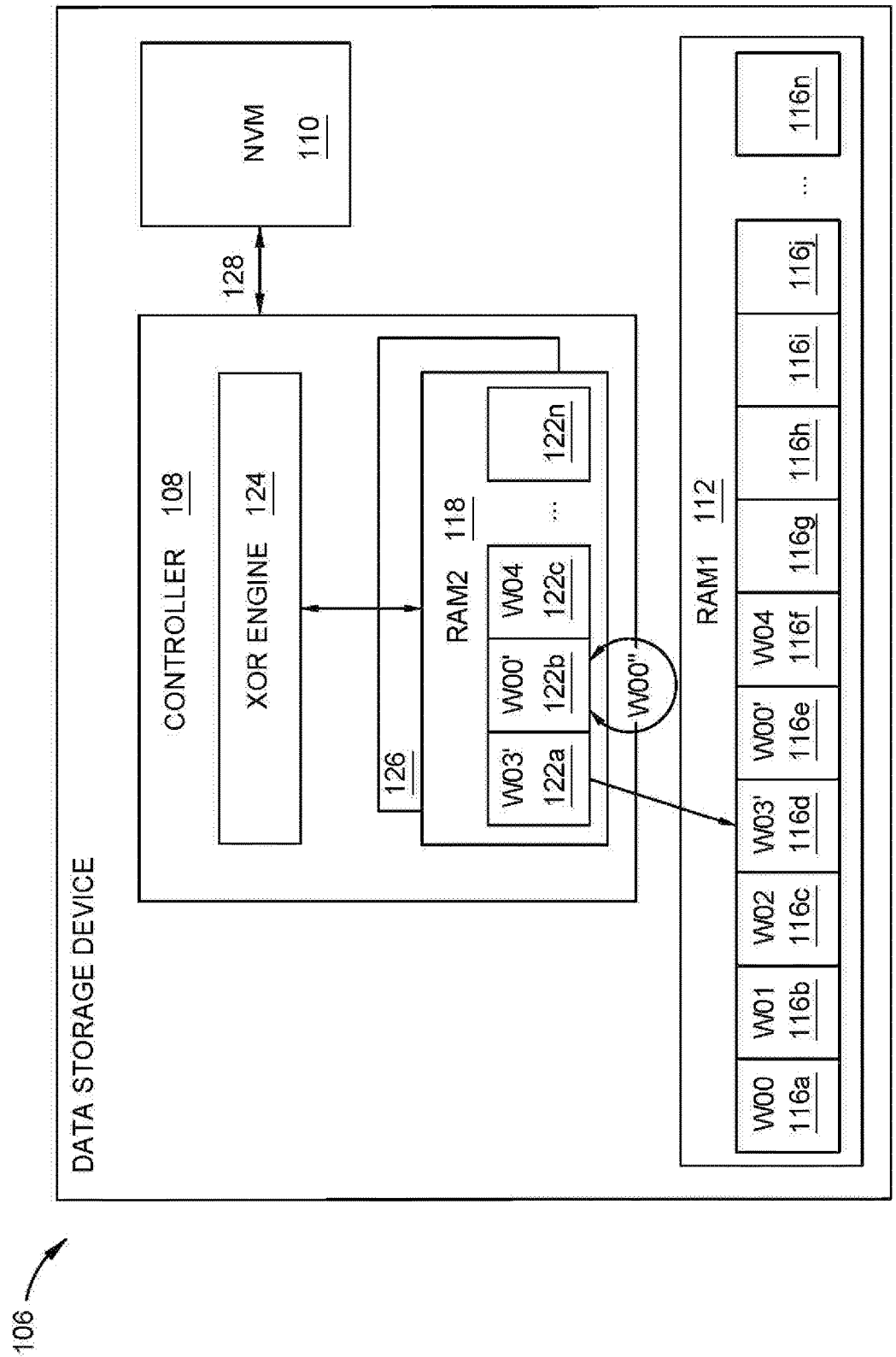

Parity data existing in the SRAM 118 may be updated multiple times if the data has not been erased from the SRAM 118. In FIG. 4F, the first updated W00' is updated a second time to re-updated first parity data W00" in the second SRAM region 122b of the SRAM 118 when a command is received to write data to the first stream. Since the updated first parity data W00' has not been erased from the SRAM 118, the updated first parity data W00' can be re-updated in its current SRAM region 122b. Furthermore, a write from the SRAM 118 to the DRAM 112 may replace existing related parity data stored in a DRAM region 116a-116n that may be outdated. For example, the third updated parity data W03' in the first SRAM region 122a of the SRAM 118 may replace the old or outdated third parity data W03 in the fourth DRAM region 116d of the DRAM 112. Once a stream is filled with user data, the corresponding parity or XOR data stored in either the SRAM or the DRAM may be written to the designated XOR die in the associated stream.

Figure 5B:
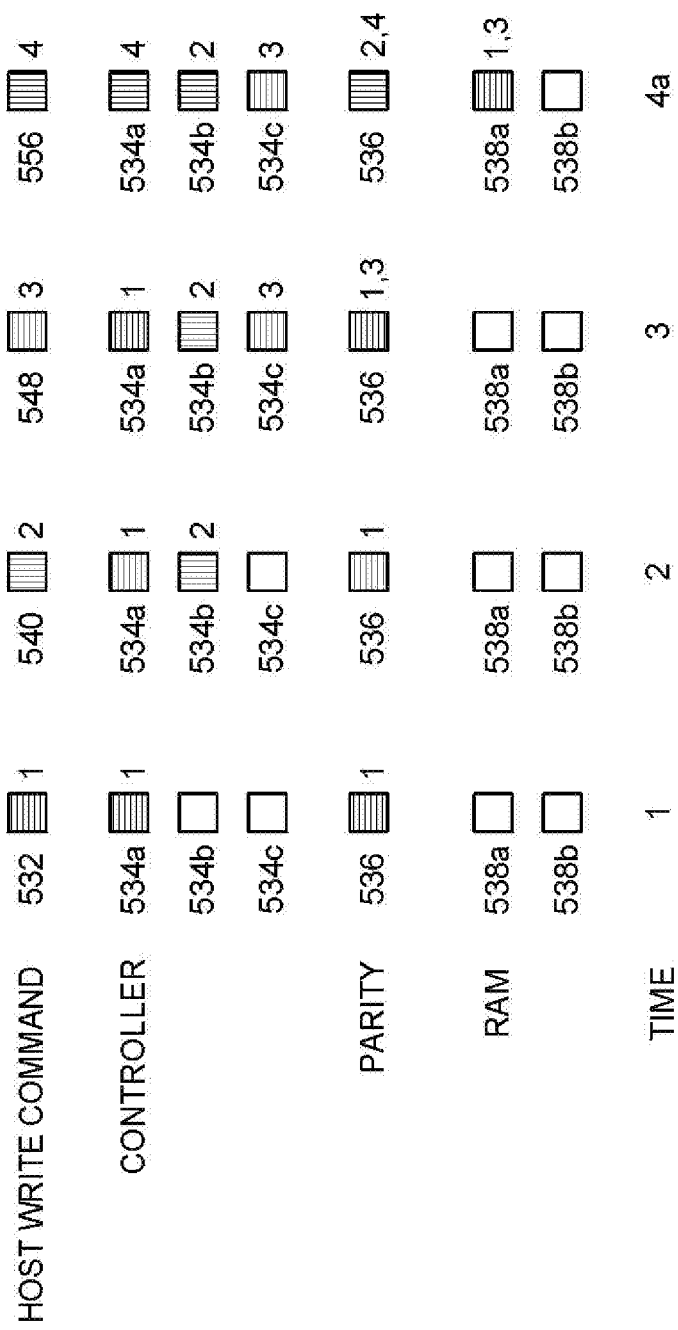

FIGS. 5A-5B illustrate schematic diagrams 500, 550, respectively, of updating data in flight, such as parity data or XOR data, over time in a storage device, according to various embodiments. The storage device of FIGS. 5A-5B may be the storage device 106 of FIG. 1. Like in the above examples, parity data will be used as an example of data in flight. The times used below are representative, and may occur in a matter of seconds or minutes. A write command to a first stream is illustrated as a horizontal striped block and a write command to a second stream is illustrated as a vertical striped block. For example, a first write command 502 is to a first stream and a second write command 510 is to a second stream.

In the diagram 500 of FIG. 5A, the controller includes three available controller RAM or buffer regions 504a, 504b, 504c for storing host write commands and one available parity RAM or buffer region 506 for storing parity data. The controller buffer regions 504a, 504b, 504c and the parity buffer region 506 may be any SRAM regions of 122a-122n of FIG. 1. The controller buffer regions 504a, 504b, 504c store data not yet written to the NVM. The storage device also includes two available RAM regions 508a, 508b for parity data storage, in which each region corresponds to a stream, such that a first RAM region 508a corresponds to a first stream and a second RAM region 508b corresponds to a second stream. The number of regions listed for each component above is not intended to be limiting, but to provide an example of a possible embodiment.

At time 1, the controller receives a first host write command 502 to write data to a first stream. The data of the first host write command 502 is stored temporarily in a first controller region 504a. Before or while the data of the first host write command 502 is written to the NVM, such as the NVM 110 of FIG. 1, the XOR engine, such as the XOR engine 124 of FIG. 1, generates first parity data in a parity buffer region 506, such as the SRAM region 122a of FIG. 1, for the first host write command 502 for the first stream.

At time 2, the controller receives a second host write command 510 to write data to a second stream. The data of the second host write command 510 is stored temporarily in a second controller region 50ba. Before or while the data of the second host write command 510 is written to the NVM, the XOR engine 124 generates second parity data in the parity buffer region 506 for the second host write command 510 for the second stream. The first parity data previously in the parity buffer region 506 is copied from the controller buffer to a RAM region 508a. The RAM region 508a may be the first DRAM region 116a of FIG. 1.

At time 3, the controller receives a third host write command 518 to write data to the first stream. The data of the third host write command 505 is stored temporarily in a third controller region 504c. Before or while the data of the third host write command 518 is written to the NVM, the XOR engine 124 generates third parity data in the parity buffer region 506 for the third host write command 518 for the first stream. The first parity data that was written to the RAM region 508a at time 2 is copied to the parity buffer region 506. The parity buffer region 506 includes first parity data for the first host write command 502 to the first stream and third parity data for the third host write command 518 to the first stream. The second parity data for the second host write command 510 to the second stream previously in the parity buffer region 506 is copied from the controller buffer to a RAM region 508b at time 3.

In the diagram 550 of FIG. 5B, the controller includes three available controller RAM or buffer regions 534a, 534b, 534c for host write commands and one available parity RAM or buffer region 536 for parity data. The controller buffer regions 534a, 534b, 534c and the parity buffer region 536 may be any SRAM region of 122a-122n of FIG. 1. The controller buffer regions 534a, 534b, 534c store data not yet written to the NVM. The storage device also includes two available RAM regions 538a, 538b for parity data storage, in which each region corresponds to a stream, such that a first RAM region 538a corresponds to a first stream and a second RAM region 538b corresponds to a second stream. The number of regions listed for each component above is not intended to be limiting, but to provide an example of a possible embodiment.

At time 1, the controller receives a first host write command 532 to write data to a first stream. The data of the first host write command 532 is stored temporarily in a first controller buffer region 534a. Before or while the data of the first host write command 532 for the first stream is written to the NVM, the XOR engine 124 generates first parity data in a parity buffer region 536 for the first host write command 532 for the first stream.

At time 2, the controller receives a second host write command 540 to write data to a second stream. The data of the second host write command 532 is stored temporarily in a second controller buffer region 534b. Because the third controller buffer region 534c is not storing or filled with data, the XOR engine 124 does not yet generate second parity data for the second host write command 540 at time 2, as the next host write command received may be to write data to the first stream. Thus, by leaving the first parity data in the parity buffer region 536, if the next host write command received is to write data to the first stream, the storage device will be able to generate parity data for the first stream in the parity buffer region 536 without pulling the parity data from a RAM region 538a.

At time 3, the controller receives a third host write command 548 to write data to the first stream. The data of the third host write command 532 is stored temporarily in a first controller buffer region 534c. Before or while the data of the third host write command 548 for the first stream is written to the NVM, the XOR engine 124 generates third parity data for the third host write command 532 for the first stream in the parity buffer region 536. The parity buffer region 536 includes both first parity data for the first host write command 532 for the first stream and third parity data for the third host write command 548 for the first stream.

At time 4, the controller receives a fourth host write command 556 to write data to the second stream. Because the controller buffer regions 534a, 534b, 534c are all currently storing data, the parity data in the parity buffer region 536 for the first stream (first parity data and third parity data) are copied to the RAM region 538a. Throughout times 1-3, a previous write command, such as the first host write command 532, in the first controller buffer region 534a has been successfully written to the NVM, and the data in the first controller buffer region 534a can be overwritten with the data of a new host write command, such as the fourth host write command 556. The data of the fourth host write command 556 is written to the first controller buffer region 534a. Before or while the data of the fourth host write command 556 for the second stream is written to the NVM, the XOR engine 124 generates both second parity data for the second host write command 540 for the second stream and fourth parity data for the fourth host write command 556 for the second stream in the parity buffer region 536.

As a comparison, the diagram 550 of FIG. 5B transfers or copies data to and from the parity buffer regions to the RAM regions few times than the diagram 500 of FIG. 5A. Since transferring data to and from the parity buffer regions to the RAM regions takes time, the diagram 550 of FIG. 5B may operate in a quicker and more efficient manner than the diagram 500 of FIG. 5A.

In order to protect the loss of data on a drive, parity data is created utilizing a XOR engine. The parity data is written to the SRAM from the XOR engine. The parity data may be written to the DRAM, pulled from the DRAM to the SRAM to be updated, or updated within the SRAM from a new write command from the XOR engine pertaining to the same parity data. As such, the efficiency of updating parity information may increase allowing for a higher rate of data transfer. Since SRAM is fast but more expensive, and DRAM is slower but cheaper, the DRAM and SRAM usages are both better optimized, reducing any DRAM access penalties. Moreover, since parity data already generated for a stream can be pulled from the DRAM to the SRAM to be updated, completely new parity or XOR data need not be generated each time, thus reducing the amount of time spent backing up or protecting user data.

In one embodiment, a storage device comprises a non-volatile storage unit. The capacity of the non-volatile storage unit is divided a plurality streams. The non-volatile storage unit comprises a plurality of dies, each of the plurality of dies comprising a plurality of erase blocks. The storage device further comprises a first volatile memory unit, a controller coupled to the non-volatile storage unit and the first volatile memory unit, and a controller comprising a second volatile memory unit. The controller is configured to receive commands to write data to one or more streams, generate first parity data for a first stream in the second volatile memory unit, and copy the first parity data for the first stream from the second volatile memory unit to the first volatile memory unit. The controller is also configured to copy second parity data for a second stream from the first volatile memory unit to the second volatile memory unit, update the second parity data for the second stream in the second volatile memory unit, and update the first parity data for the first stream in the second volatile memory unit.

The controller is configured to erase the first parity and the second parity data from the second volatile memory. The first parity data for the first stream is copied from the second volatile memory unit to the first volatile memory unit when a controller buffer area of the second volatile memory unit is filled to capacity, the controller buffer area temporarily storing data to be written to the non-volatile storage unit. The controller is further configured to write data associated with a first command to the first stream while simultaneously generating the first parity data for the first stream. The controller is further configured to write data associated with a second command to the second stream while simultaneously updating the second parity data for the second stream. The non-volatile storage unit is a NAND memory unit. The controller comprises an XOR engine. The XOR engine is configured to generate the first parity data for the first stream in the second volatile memory unit, update the second parity data for the second stream in the second volatile memory unit, and update the first parity data for the first stream in the second volatile memory unit.

In another embodiment, a storage device comprises a non-volatile storage unit. A capacity of the non-volatile storage unit is divided into a plurality of streams. The non-volatile storage unit comprises a plurality of dies, each of the plurality of dies comprising a plurality of erase blocks. The storage device further comprises a first volatile memory unit, a controller coupled to the non-volatile storage unit and the first volatile memory unit, and a controller comprising a second volatile memory unit. The controller is configured to receive a first command to write data to a first stream in the non-volatile storage unit, generate first parity data for the data associated with first command and write the data associated with the first command to the first stream simultaneously, wherein the first parity data is stored in the second volatile memory unit. The controller is also configured to receive a second command to write data to a second stream in the non-volatile storage unit, copy second parity data associated with the second stream from the first volatile memory unit to the second volatile memory unit, and update the second parity data with the data associated with second command and write the data associated with the second command to the second stream simultaneously.

The controller is further configured to copy the first parity data from the second volatile memory unit to the first volatile memory unit once a controller buffer area of the second volatile memory unit is filled to capacity, the controller buffer area temporarily storing data to be written to the non-volatile storage unit. The controller comprises an XOR engine. The XOR engine is configured to generate the first parity data and update the second parity data. The first volatile memory unit is a DRAM unit and the second volatile memory unit is a SRAM unit. The first non-volatile unit is a NAND memory unit. The controller is further configured to copy the second parity data from the second volatile memory unit to the first volatile memory unit once the second parity data is generated. The controller is further configured to receive a third command to write data to the first stream in the non-volatile storage unit, update the first parity data with the data associated with second command in the second volatile memory unit, and write data associated with the second command to the second stream simultaneously. The controller is also configured to copy the first parity data from the second volatile memory unit to the first volatile memory unit once the first parity data is updated.

In another embodiment, a storage device comprises a non-volatile storage unit. A capacity of the non-volatile storage unit is divided into a plurality of streams. The non-volatile storage unit comprises a plurality of dies, each of the plurality of dies comprising a plurality of erase blocks. The storage device further comprises a DRAM unit, a controller coupled to the non-volatile storage unit and the DRAM unit, and a controller comprising a SRAM unit. The controller is configured to receive a first command to write data to a first stream in the non-volatile storage unit, update first parity data with the data associated with first command in a first location of the SRAM unit, and simultaneously, write the data associated with the first command to the first stream. The controller is also configured to receive a second command to write data to a second stream in the non-volatile storage unit, copy the updated first parity data from the SRAM unit to the DRAM unit, and simultaneously, copy second parity data associated with the second stream from the DRAM unit to a second location in the SRAM unit. The controller is also configured to update the second parity data with the data associated with second command and write the data associated with the second command to the second stream simultaneously. The controller is also configured to receive a third command to write data to a third stream in the non-volatile storage unit, erase the updated first parity data from the first location in the SRAM unit, and generate third parity data in the first location of the SRAM unit, and simultaneously, write the data associated with the third command to the first stream.

The controller is configured to copy the updated second parity data from the SRAM unit to the DRAM unit as the updated first parity data is erased and as the third parity data is generated. The controller comprises a parity engine that is configured to generate and update parity data for the controller. The updated first parity data is copied from the SRAM unit to the DRAM unit when a controller buffer area of the SRAM unit is filled to capacity, the controller buffer area temporarily storing data to be written to the non-volatile storage unit. The controller is further configured to copy the third parity data from the SRAM unit to the DRAM unit after generating the third parity data. The controller is further configured to receive a fourth command to write data to the first stream in the non-volatile storage unit, copy the first parity data from the DRAM unit to the SRAM unit, and simultaneously, copy the third parity data associated with the third stream from the SRAM unit to a second location in the DRAM unit. The controller will also update the first parity data with the data associated with the fourth command and write the data associated with the fourth command to the first stream simultaneously.

While the foregoing is directed to embodiments of the present disclosure, other and further embodiments of the disclosure may be devised without departing from the basic scope thereof, and the scope thereof is determined by the claims that follow.

What is claimed is:

1. A storage device, comprising:
   a non-volatile storage unit, wherein a capacity of the non-volatile storage unit is divided into a plurality of streams, and wherein the non-volatile storage unit comprises a plurality of dies, each of the plurality of dies comprising a plurality of erase blocks;
   a first volatile memory unit; and
   a controller coupled to the non-volatile storage unit and the first volatile memory unit, the controller comprising a second volatile memory unit, wherein the controller is configured to:
   receive commands to write data to one or more streams of the plurality of streams;
   generate and store first parity data for a first stream in the second volatile memory unit;
   upon receiving a first new command to write first data to a second stream, copy second parity data for the second stream from the first volatile memory unit to the second volatile memory unit;
   update the second parity data for the second stream to updated second parity data in the second volatile memory unit;
   in response to updating the second parity data, copy the updated second parity data from the second volatile memory unit to the first volatile memory unit;
   upon receiving a second new command to write second data to the first stream, update the first parity data for the first stream to updated first parity data in the second volatile memory unit; and
   in response to updating the first parity data, copy the updated first parity data from the second volatile memory unit to the first volatile memory unit.

2. The storage device of claim 1, wherein the controller is further configured to erase the first parity data and the second parity data from the second volatile memory.

3. The storage device of claim 1, wherein the updated first parity data for the first stream is copied from the second volatile memory unit to the first volatile memory unit when a controller buffer area of the second volatile memory unit is filled to capacity, the controller buffer area temporarily storing write data to be written to the non-volatile storage unit.

4. The storage device of claim 1, wherein the controller is further configured to write the first data to the first stream while simultaneously generating the first parity data for the first stream.

5. The storage device of claim 1, wherein the controller is further configured to write the second data to the second stream while simultaneously updating the second parity data for the second stream.

6. The storage device of claim 1, wherein the non-volatile storage unit is a NAND memory unit, and wherein the controller comprises an XOR engine.

7. The storage device of claim 6, wherein the XOR engine is configured to:
   generate the first parity data for the first stream in the second volatile memory unit;
   update the second parity data for the second stream in the second volatile memory unit; and
   update the first parity data for the first stream in the second volatile memory unit.

8. A storage device, comprising:
   a non-volatile storage unit, wherein a capacity of the non-volatile storage unit is divided into a plurality of streams, and wherein the non-volatile storage unit comprises a plurality of dies, each of the plurality of dies comprising a plurality of erase blocks;
   a first volatile memory unit; and
   a controller coupled to the non-volatile storage unit and the first volatile memory unit, the controller comprising a second volatile memory unit, wherein the controller is configured to:
   receive a first command to write first data to a first stream of the plurality of streams in the non-volatile storage unit;
   generate first parity data for the first data and write the first data to the first stream simultaneously, wherein the first parity data is stored in the second volatile memory unit;
   in response to generating and storing the first parity data in the second volatile memory unit, copy the first parity data to the first volatile memory unit;
   receive a second command to write second data to a second stream in the non-volatile storage unit;
   upon receiving the second command, copy second parity data associated with the second stream from the first volatile memory unit to the second volatile memory unit;
   update the second parity data with the second data and write the second data to the second stream simultaneously; and
   in response to updating the second parity data, copy the updated second parity data from the second volatile memory unit to the first volatile memory unit.

9. The storage device of claim 8, wherein the controller is further configured to copy the first parity data from the second volatile memory unit to the first volatile memory unit once a controller buffer area of the second volatile memory unit is filled to capacity, the controller buffer area temporarily storing write data to be written to the non-volatile storage unit.

10. The storage device of claim 8, wherein the controller further comprises an XOR engine, and wherein the XOR engine is configured to generate the first parity data and update the second parity data.

11. The storage device of claim 8, wherein the first volatile memory unit is a DRAM unit.

12. The storage device of claim 8, wherein the second volatile memory unit is a SRAM unit.

13. The storage device of claim 8, wherein the non-volatile storage unit is a NAND memory unit.

14. The storage device of claim 8, wherein the controller is further configured to:
   receive a third command to write third data to the first stream in the non-volatile storage unit;
   in response to receiving the third command, copy the first parity data from the first volatile memory unit to the second volatile memory unit;
   update the first parity data with the third data in the second volatile memory unit and write the third data to the first stream simultaneously; and
   upon updating the first parity data, copy the updated first parity data from the second volatile memory unit to the first volatile memory unit.

15. A storage device, comprising:
a non-volatile storage unit, wherein a capacity of the non-volatile storage unit is divided into a plurality of streams, and wherein the non-volatile storage unit comprises a plurality of dies, each of the plurality of dies comprising a plurality of erase blocks;
a DRAM unit; and
a controller coupled to the non-volatile storage unit and the DRAM unit, the controller comprising a SRAM unit, wherein the controller is configured to:
receive a first command to write first data to a first stream of the plurality of streams in the non-volatile storage unit;
update first parity data associated with the first stream with the first data in a first location of the SRAM unit, and simultaneously, write the first data to the first stream;
receive a second command to write second data to a second stream in the non-volatile storage unit;
in response to updating the first parity, copy the updated first parity data from the SRAM unit to the DRAM unit, and simultaneously, copy second parity data associated with the second stream from the DRAM unit to a second location in the SRAM unit;
update the second parity data with the second data and write the second data to the second stream simultaneously;
in response to updating the second parity data, copy the updated second parity data from the second location in the SRAM unit to the DRAM unit;
receive a third command to write third data to a third stream in the non-volatile storage unit;
erase the updated first parity data from the first location in the SRAM unit; and
generate third parity data associated with the third stream with the third data in the first location of the SRAM unit, and simultaneously, write the third data to the third stream.

16. The storage device of claim 15, wherein the controller is further configured to copy the updated second parity data from the SRAM unit to the DRAM unit as the updated first parity data is erased and as the third parity data is generated.

17. The storage device of claim 15, wherein the controller comprises a parity engine, the parity engine being configured to generate and update parity data for the controller.

18. The storage device of claim 15, wherein the updated first parity data is copied from the SRAM unit to the DRAM unit when a controller buffer area of the SRAM unit is filled to capacity, the controller buffer area temporarily storing write data to be written to the non-volatile storage unit.

19. The storage device of claim 15, wherein the controller is further configured to copy the third parity data from the SRAM unit to the DRAM unit after generating the third parity data.

20. The storage device of claim 15, wherein the controller is further configured to:
receive a fourth command to write fourth data to the first stream in the non-volatile storage unit;
copy the first parity data from the DRAM unit to the SRAM unit, and simultaneously, copy the third parity data associated with the third stream from the SRAM unit to a second location in the DRAM unit; and
update the first parity data with the fourth data and write the fourth data to the first stream simultaneously.

* * * * *